(12) United States Patent
Yang et al.

(10) Patent No.: US 12,320,985 B2
(45) Date of Patent: Jun. 3, 2025

(54) METHOD FOR IMPROVING ANTENNA PERFORMANCE IN ELECTRONIC DEVICE COMPRISING A PLURALITY OF ANTENNAS AND DEVICE THEREOF

(71) Applicant: Samsung Electronics Co., Ltd., Gyeonggi-do (KR)

(72) Inventors: Sungkwang Yang, Gyeonggi-do (KR); Sungmin Kim, Gyeonggi-do (KR); Yeongmin Park, Gyeonggi-do (KR); Kyoungjin Ahn, Gyeonggi-do (KR); Byounguk Yoon, Gyeonggi-do (KR); Jongchul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 17/861,326

(22) Filed: Jul. 11, 2022

(65) Prior Publication Data

US 2022/0342223 A1    Oct. 27, 2022

Related U.S. Application Data

(63) Continuation of application No. PCT/KR2021/013975, filed on Oct. 12, 2021.

(30) Foreign Application Priority Data

Oct. 12, 2020   (KR) .................... 10-2020-0131369

(51) Int. Cl.
*G02B 27/01* (2006.01)
*H01Q 1/27* (2006.01)

(52) U.S. Cl.
CPC ..... *G02B 27/0176* (2013.01); *G02B 27/0172* (2013.01); *H01Q 1/273* (2013.01); *G02B 2027/0178* (2013.01)

(58) Field of Classification Search
CPC ............ G02B 27/0176; G02B 27/0172; G02B 2027/0178; G02B 2027/014; H01Q 1/273; G01J 1/42; G01J 1/4204
(Continued)

(56) References Cited

U.S. PATENT DOCUMENTS 9,549,290 B2 * 1/2017 Smith ............... H04W 36/0072
2008/0055537 A1   3/2008 Asrani et al.
(Continued)

FOREIGN PATENT DOCUMENTS

JP   2002-247484 A   8/2002
JP   2015-233228 A   12/2015
(Continued)

*Primary Examiner* — William R Alexander
(74) *Attorney, Agent, or Firm* — Cha & Reiter, LLC

(57) ABSTRACT

An electronic device according to an embodiment may include at least one display, a main frame to which the at least one display is mounted, a first support frame which is connected to the main frame through a first connector and includes a first antenna, a second support frame which is connected to the main frame through a second connector and includes a second antenna, at least one processor, and at least one sensor. The at least one processor may perform, when the at least one sensor detects that the electronic device is unfolded, wireless communication using the first antenna and the second antenna, and, when the at least one sensor detects that the electronic device is folded, may turn off the first antenna and/or the second antenna, connect first antenna and/or the second antenna to a ground, or shift a resonance frequency of first antenna and/or the second antenna.

15 Claims, 11 Drawing Sheets

(58) Field of Classification Search
USPC .......................................................... 359/702
See application file for complete search history.

(56) References Cited

U.S. PATENT DOCUMENTS

| | | | |
|---|---|---|---|
| 2015/0181388 A1* | 6/2015 | Smith | ............... H04W 36/0072 |
| | | | 455/556.1 |
| 2017/0279188 A1 | 9/2017 | Hiramatsu | |
| 2018/0093177 A1 | 4/2018 | Tokubo | |
| 2019/0033622 A1 | 1/2019 | Olgun et al. | |
| 2019/0212566 A1* | 7/2019 | Lee | .................... G02B 27/0172 |
| 2020/0176854 A1* | 6/2020 | Jung | ....................... H01Q 1/243 |
| 2021/0124175 A1* | 4/2021 | Lee | .......................... G01B 7/30 |

FOREIGN PATENT DOCUMENTS

| | | |
|---|---|---|
| JP | 2017-175438 A | 9/2017 |
| KR | 10-2009-0045927 A | 5/2009 |
| KR | 10-1971682 B1 | 8/2019 |
| KR | 10-2020-0029592 A | 3/2020 |

\* cited by examiner

METHOD FOR IMPROVING ANTENNA PERFORMANCE IN ELECTRONIC DEVICE COMPRISING A PLURALITY OF ANTENNAS AND DEVICE THEREOF

CROSS-REFERENCE TO RELATED APPLICATIONS

This application is a Bypass Continuation Application of International Application No. PCT/KR2021/013975, which was filed on Oct. 12, 2021, and is based on and claims priority under 35 U.S.C. § 119 to Korean Patent Application No. 10-2020-0131369, which was filed in the Korean Intellectual Property Office on Oct. 12, 2020, the entire disclosure of each of which is incorporated herein by reference.

BACKGROUND

1. Field

One or more embodiments disclosed herein generally relate to a method for improving the antenna performance of an electronic device that includes multiple antennas, and an apparatus therefor.

2. Description of Related Art

Augmented reality (AR) is a branch of virtual reality (VR) and refers to a computer graphic technique for synthesizing virtual objects or information with the actually existing environment such that the virtual objects appear as if they exist in the real environment. AR can be characterized as a display technology for displaying virtual objects superimposed on images of the actual world as seen by users, and this technology may be applied to various products such as head mounted display (HMD) devices or AR glasses. AR can be implemented to provide the user with various user experiences.

The HMD device or AR glass configured to provide AR may include an antenna for transmitting/receiving signals with an external device and for conducting wireless communication with electronic components inside the device.

Meanwhile, recently available glass-type electronic devices (such as the aforementioned AR glass) may provide comparatively simple functions relative to other devices such as mobile phones, and may transmit/receive signals through wired connection or by using a single antenna.

SUMMARY

An electronic device (for example, AR glass) configured to provide AR requires multiple antennas for processing a larger amount of data, but the main frame (or housing) on which electronic components are arranged may not have sufficient space to mount the antennas. In addition, in view of the current trend towards having housings that are slim in order to reduce the weight of electronic devices and to provide user convenience, antennas may need to be arranged on a wearing portion connected to the main frame. The wearing portion of the glasses is the portion extending from the main frame and supported by the user's ears. The wearing portion may be referred to as "support frame" hereinafter.

However, if multiple antennas are mounted on the wearing portion of the electronic device, the multiple antennas may overlap each other in some situations, depending on the state of use of the electronic device, and interference between the antennas in such a situation may degrade the antenna radiation performance.

Certain embodiments disclosed herein implement a method for preventing degradation of the antenna performance caused by overlapping antennas of an electronic device that includes multiple antennas, or for improving the antenna radiation performance by removing the parasitic resonance, and an apparatus therefor.

An electronic device according to an embodiment may include at least one display configured to provide a left-eye image and/or a right-eye image, a main frame to which the at least one display is mounted, a first support frame which is connected to the main frame through a first connector and includes a first antenna, a second support frame which is connected to the main frame through a second connector positioned opposite of the first connector and includes a second antenna, at least one processor electrically connected to the first antenna and the second antenna, and at least one sensor electrically connected to the at least one processor, wherein the at least one processor is configured to perform, when the at least one sensor detects that the electronic device is unfolded, wireless communication using the first antenna and the second antenna, and when the at least one sensor detects that the electronic device is folded, turn off the first antenna and/or the second antenna, connect the first antenna and/or the second antenna to a ground, or shift a resonance frequency of the first antenna and/or the second antenna.

An operation method of an electronic device according to an embodiment may include performing wireless communication using a first antenna and a second antenna included in the electronic device when at least one sensor included in the electronic device detects that the electronic device is unfolded, and when the at least one sensor detects that the electronic device is folded, turning off the first antenna and/or the second antenna, connecting the first antenna and/or the second antenna to a ground, or shifting a resonance frequency of the first antenna and/or the second antenna.

A wearable device according to an embodiment may include a first display for a left-eye image, a second display for a right-eye image, a main frame to which the first display and the second display are mounted, a first support frame which is connected to the main frame through a first connector adjacent to the first display and includes a first antenna, a second support frame which is connected to the main frame through a second connector positioned adjacent to the second display and opposite of the first connector, and includes a second antenna, at least one processor electrically connected to the first antenna and the second antenna, and at least one sensor electrically connected to the at least one processor, wherein the at least one processor is configured to display virtual reality through the first display and/or the second display, perform wireless communication using the first antenna and the second antenna when the at least one sensor detects that the wearable device is unfolded, and when the at least one sensor detects that the wearable device is folded, turn off the first antenna and/or the second antenna, connect the first antenna and/or the second antenna to a ground, or shift a resonance frequency of the first antenna and/or the second antenna.

According to certain embodiments disclosed herein, if overlapping occurs between antennas of an electronic device that includes multiple antennas, interference between the antennas may be prevented by switching at least one antenna, and degradation of the antenna radiation performance may thus be prevented.

In addition, at least one antenna may be turned on or off or connected to the ground, or at least one resonance frequency may be shifted, based on the state of use of the electronic device that includes multiple antennas, thereby improving the antenna radiation performance.

Moreover, the same advantageous effects may be obtained in relation to not only an electronic device configured to provide augmented reality, but also an electronic device configured to provide virtual reality.

Various other advantageous effects inferred directly or indirectly through this document may be provided.

BRIEF DESCRIPTION OF THE DRAWINGS

The above and other aspects, features, and advantages of certain embodiments of the disclosure will be more apparent from the following detailed description taken in conjunction with the accompanying drawings, in which.

In relation to the description of the drawings, identical or similar reference numerals may be used to denote identical or similar elements.

DETAILED DESCRIPTION

Hereinafter, various embodiments of the disclosure will be described with reference to the accompanying drawings. However, it should be understood that there is no intent to limit the disclosure to the particular forms disclosed herein, and the disclosure should be construed to cover various modifications, equivalents, or alternatives of embodiments of the disclosure.

Figure 1A:
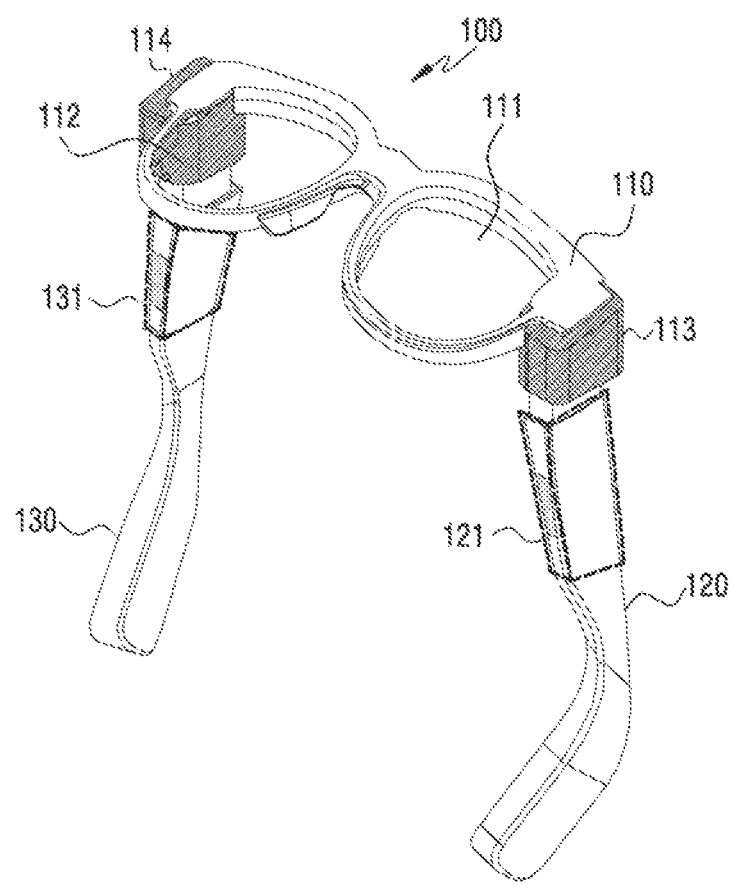
FIG. 1A illustrates an unfolded state of an electronic device according to an embodiment.
Figure 1B:
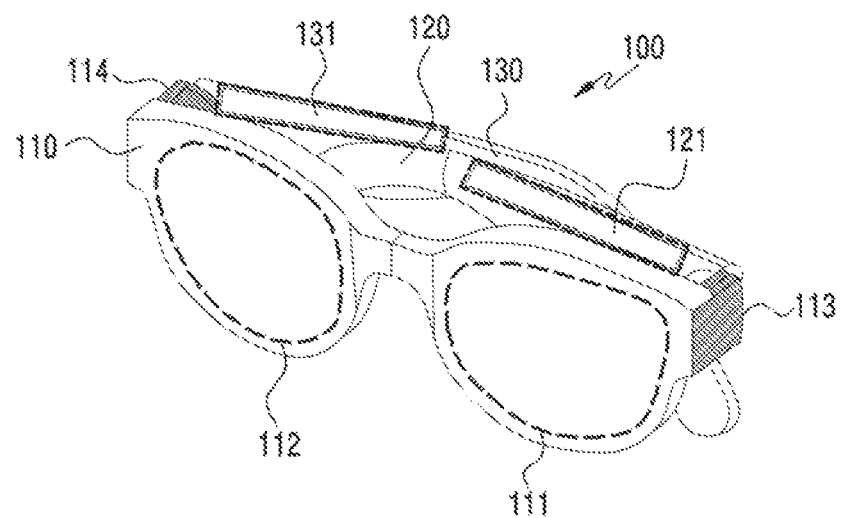
FIG. 1B illustrates a folded state of an electronic device according to an embodiment.

FIG. 1A illustrates an unfolded state of an electronic device 100 according to an embodiment. FIG. 1B illustrates a folded state of the electronic device 100 according to an embodiment.

Referring to FIGS. 1A and 1B, the electronic device 100 may include a main frame 110, a first support frame 120 connected to the main frame 110 through a first connector 113, and a second support frame 130 connected to the main frame 110 through the second connector 114.

According to an embodiment, when a user wears the electronic device 100, the main frame 110 may block the user's sight or may be positioned in the path of the user's sight. For example, when a user wears the electronic device 100, the main frame 110 may at least partially cover the user's face.

According to an embodiment, a first antenna 121 may be mounted in at least a portion of the first support frame 120, and a second antenna 131 may be mounted in at least a portion of the second support frame 130. For example, the entirety of the first support frame 120 may operate as a radiator implementing the first antenna 121. Alternatively, a conductive portion (not shown) forming a portion of the first support frame 120 may operate as a radiator implementing the first antenna 121.

According to an embodiment, the first connector 113 may physically connect the main frame 110 to the first support frame 120, and may be disposed such that the main frame 110 and the first support frame 120 can rotate within an angle of a designated range about the first connector 113. In an example, the first connector 113 may be formed as a hinge structure so as to rotatably fix the main frame 110 and the first support frame 120, and may be disposed to allow the main frame 110 and the first support frame 120 to rotate about the first connector 113. The above description of the first connector 113 may be identically applied to the second connector 114, except for the rotation direction.

According to an embodiment, a first display 111 for a left-eye image and/or a second display 112 for a right-eye image may be seated in the main frame 110. In an example, the first display 111 and the second display 112 may be a near-to-eye display (NED) or a head-mounted display (HMD). In another example, the first display 111 and the second display 112 may be a see-through display, which is a type of near-to-eye display. According to an embodiment, a light waveguide may be included in at least a portion of the electronic device 100, and one region of the light waveguide may correspond to a see-through display. The see-through display may be positioned very close to the user's eyes, and the user may wear the electronic device 100 including the see-through display as they would wear glasses. In another example, a projector capable of projecting light and recognizing an object through reflected light may be included in at least a portion of the electronic device 100.

According to an embodiment, the electronic device 100 may display an augmented-reality image through the first display 111 and/or the second display 112. In an example, the first display 111 and/or the second display 112 may allow light of a real environment (or a real object) to pass therethrough, and the user may recognize the light of the real environment that has passed through the first display 111 and/or the second display 112.

According to another embodiment, the first display 111 and/or the second display 112 may be a transparent display which can display an image of a virtual object while allowing light of a real object to pass therethrough. For example, the electronic device 100 may display an image of a virtual object through the first display 111 and/or the second display 112, and the user may recognize the real object and the virtual object through the first display 111 and/or the second display 112 of the electronic device 100. Thus, the electronic device 100 may provide augmented reality to the user.

According to an embodiment, the first display 111 and/or the second display 112 may include a transparent material such as glass or plastic.

Electronic components disposed within the main frame 110, the first support frame 120, and the second support frame 130 may be electrically connected to one another through a flexible printed circuit board (FPCB). The FPCB may be routed through the first connector 113 and the second connector 114. Accordingly, when a battery is disposed in the main frame 110, power may be transmitted to the first antenna 121 and second antenna 131 via the FPCB through the first connector 113 and the second connector 114.

Figure 2:
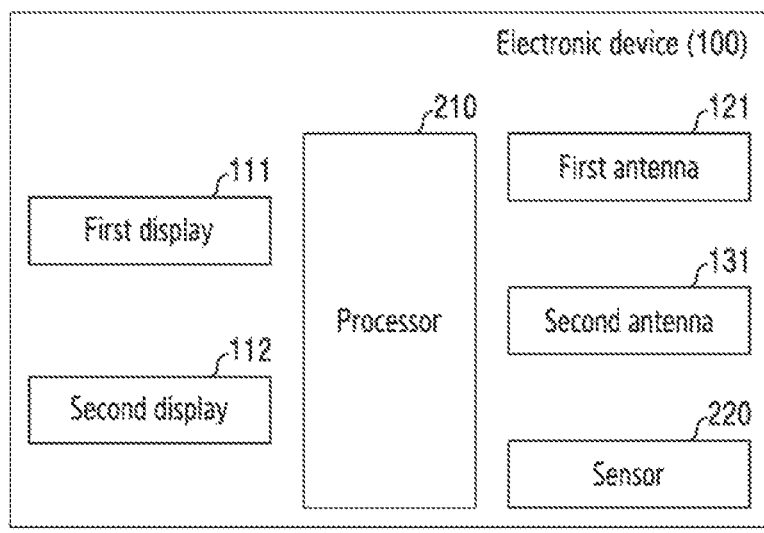
FIG. 2 is a block diagram illustrating hardware elements of an electronic device according to an embodiment.

FIG. 2 is a block diagram illustrating hardware elements of the electronic device 100 according to an embodiment.

Referring to FIG. 2, the electronic device 100 may include the first display 111, the second display 112, at least one processor 210, the first antenna 121, the second antenna 131, and at least one sensor 220. In an example, elements included in the electronic device 100 may not be limited to the elements (e.g., the first display 111, the second display 112, the processor 210, the first antenna 121, the second antenna 131, or the sensor 220) illustrated in the block diagram of FIG. 2. For example, instead of separately including the first display 111 or the second display 112, the electronic device 100 may include only one display in which the first display 111 and the second display 112 are integrated with/formed integrally with each other.

The elements of the electronic device 100, illustrated in FIG. 2, may be replaced with other elements, or additional elements may be added to the electronic device 100. For example, the electronic device 100 may further include an audio module and a memory, in addition to the elements illustrated in FIG. 2. In another example, at least some of the elements of an electronic device 1001 illustrated in FIG. 10 may be included in the electronic device 100 illustrated in FIG. 2.

According to an embodiment, the at least one processor 210 may be electrically and/or operatively connected to the first display 111, the second display 112, the first antenna 121, the second antenna 131, or the at least one sensor 220 so as to control the operation of the first display 111, the second display 112, the first antenna 121, the second antenna 131, or the at least one sensor 220. In an example, the at least one processor 210 may receive commands from the elements included in the electronic device 100, may interpret the received commands, and may process and/or perform an operation on various types of data on the basis of the interpreted commands. The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, the electronic device 100 may receive, from an external device (e.g., a portable terminal, or the electronic device 1001 in FIG. 10), data processed by a processor embedded in the external device. For example, the electronic device 100 may capture an image of an object (e.g., a real object outside the electronic device 100) through a camera, may transmit the captured image to an external device, and may receive data based on the transmitted image from the external device. The external device may generate image data related to augmented reality on the basis of information (e.g., a shape, a color, or a position) about the imaged object, received from the electronic device 100, and may transmit the image data to the electronic device 100. In another example, the electronic device 100 may request an external device for additional information based on an image of an object, captured through a camera, and may receive the additional information from the external device.

According to an embodiment, the at least one sensor 220 may include an eye-tracking sensor, a hall IC sensor, or an illuminance sensor. The at least one sensor 220 may not be limited to the above-described examples. For example, the at least one sensor may further include a proximity sensor or a contact sensor capable of sensing whether the user is wearing the electronic device 100.

According to an embodiment, the electronic device 100 may detect, through a proximity sensor or a contact sensor, whether the user is wearing the electronic device 100. For example, when it is detected that the user is wearing the electronic device 100, the electronic device 100 may manually and/or automatically pair with an external electronic device (e.g., a smartphone).

According to an embodiment, the at least one sensor 220 may be disposed on at least one surface of the inside or outside of each of the housing elements of the electronic device 100 shown in FIGS. 1A and 1B. For example, the at least one sensor may be disposed in at least a portion of the main frame 110. In another example, the at least one sensor 220 may be disposed on one surface of the inside or outside of the first support frame 120 and/or the second support frame 130. The first support frame 120 and the second support frame 130 may be supported by the user's ears, the at least one sensor may be disposed on one surface of the inside or outside of the first support frame 120 and/or the second support frame 130, and the location of the at least one sensor may correspond to one or more temples of the user when the electronic device 100 is worn.

According to an embodiment, an illuminance sensor may detect illuminance (or brightness) around the electronic device 100. According to an embodiment, values detected by the illuminance sensor may vary depending on the position at which the illuminance sensor is disposed in the electronic device 100, that is, the position at which the illuminance sensor detects illuminance (or brightness). The various sensing values may be reflected in the amount of light (or brightness) of a display of the electronic device 100. The electronic device 100 may adjust the light amount (or brightness) of the display by reflecting the various values detected by the illuminance sensor.

According to an embodiment, the electronic device 100 may include multiple illuminance sensors. For example, the illuminance sensors may be separately disposed on one surface of the inside of the electronic device 100 and one surface of the outside thereof.

Figure 3:
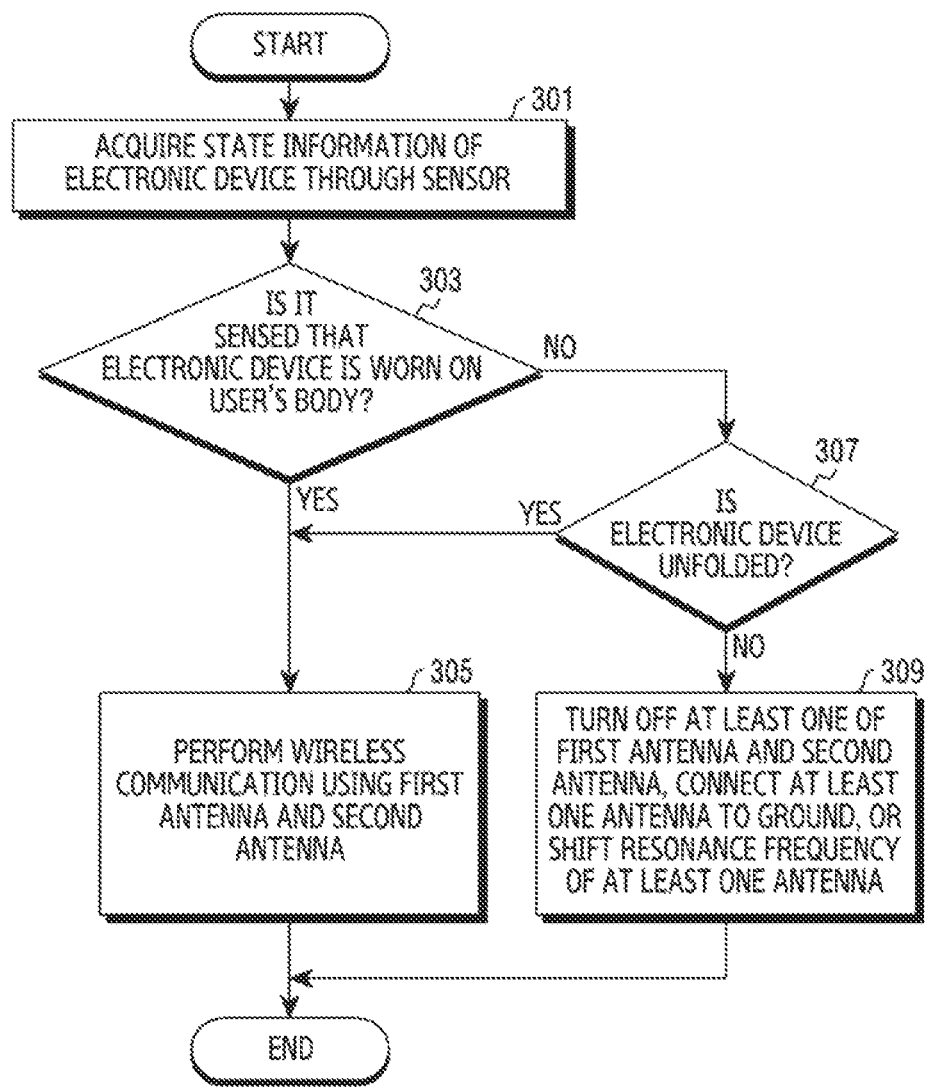
FIG. 3 illustrates a flowchart of operations of an electronic device according to an embodiment.

FIG. 3 illustrates a flowchart of operations of the electronic device 100 according to an embodiment. The series of operations described below may be performed simultaneously or in a different order than the order shown in the figure by the electronic device 100, and some operations may be omitted therefrom or added thereto.

Referring to FIG. 3, the electronic device 100 may acquire state information of the electronic device 100 through the at least one sensor 220, may detect, based on the acquired state information, whether the electronic device 100 is worn on a user's body, and may determine, based on whether the electronic device 100 is worn on the user's body, the operation of the first antenna 121 and/or the second antenna 131.

In operation 301, the electronic device 100 according to an embodiment may acquire state information of the electronic device 100 through the at least one sensor 220. For example, the electronic device 100 may acquire state information of the electronic device 100 by using at least one of a proximity sensor and a contact sensor.

In an example, the electronic device 100 may acquire, using a capacitance value of the proximity sensor, information about whether the electronic device 100 is worn on a user's body. For example, when the electronic device 100 is worn on the user's body, the capacitance value of the proximity sensor and/or the contact sensor may change so as to be equal to or greater than a designated range, and the electronic device 100 may acquire, through the capacitance value of the proximity sensor and/or the contact sensor, information indicating that the electronic device 100 is being worn on the user's body. In another example, when the electronic device 100 is removed from the user's body, the capacitance value of the proximity sensor and/or the contact sensor may change to be equal to or less than the designated range, and the electronic device 100 may acquire, through the capacitance value of the proximity sensor and/or the contact sensor, information indicating that the electronic device 100 is not being worn on the user's body.

In operation 303, the electronic device 100 according to an embodiment may determine whether it is detected that the electronic device 100 is worn on the user's body. In an example, the electronic device 100 may determine, based on the state information of the electronic device 100 acquired through the proximity sensor or the contact sensor, whether the electronic device 100 is worn on the user's body. For example, when the electronic device 100 is worn on the user's body, the capacitance value of the proximity sensor may change so as to be equal to or greater than a designated range, and the electronic device 100 may detect, through the capacitance value of the proximity sensor, that the electronic device 100 is worn on the user's body.

In operation 305, the electronic device 100 according to an embodiment may perform wireless communication using the first antenna 121 and the second antenna 131. For example, when it is detected that the electronic device 100 is worn on the user's body, the electronic device 100 may perform wireless communication using both the first antenna 121 and the second antenna 131.

According to an embodiment, when wireless communication is performed using both the first antenna 121 and the second antenna 131, the efficiency of antenna radiation by the electronic device 100 may be increased. For example, the first antenna 121 and the second antenna 131 of the electronic device 100 may be used in difference frequency bands to simultaneously process signals having different frequencies, or the first antenna 121 and the second antenna 131 may be used as an antenna array or a diversity antenna so as to increase the intensity of signals which are transmitted or received.

According to an embodiment, when it is detected that the electronic device 100 is not worn on the user's body, in operation 307, the electronic device 100 may determine whether the same is unfolded. In an example, when the electronic device 100 is unfolded, the electronic device 100 may perform, in operation 305, wireless communication using the first antenna 121 and the second antenna 131.

According to an embodiment, when the electronic device 100 is not unfolded, in operation 309, the electronic device 100 may turn off at least one of the first antenna 121 or the second antenna 131, may connect the same to the ground, or may shift at least one resonance frequency. For example, when it is detected that the electronic device 100 is not worn on the user's body and its support frames are folded with respect to the main frame, the electronic device 100 may turn off at least one of the first antenna 121 or the second antenna 131, may connect at least one of the first antenna 121 or the second antenna 131 to the ground, or may shift at least one of resonance frequencies at which the first antenna 121 and the second antenna 131 resonate.

According to an embodiment, the resonance frequencies at which the first antenna 121 and the second antenna 131 resonate may include multiple frequency bands. For example, the resonance frequency at which the first antenna 121 and the second antenna 131 resonate may be one of 2.4 GHz, 5 GHz, or 6 GHz.

According to an embodiment, when at least one of the first antenna 121 or the second antenna 131 is turned off, performance degradation due to interference between the first antenna 121 and the second antenna 131 may be prevented. For example, when the electronic device 100 is folded (i.e., when the first support frame 120 and the second support frame 130 rotate about the first connector 113 and the second connector 114 by a predetermined angle or larger with respect to the main frame 110, so that the first support frame 120 and the second support frame 130 are positioned adjacent to each other), turning off at least one of the first antenna 121 or the second antenna 131 allows the other antenna, which is not turned off, to operate as the antenna radiator without interference from the antenna which has been turned off.

According to an embodiment, when at least one of the first antenna 121 or the second antenna 131 is connected to the ground, antenna radiation performance degradation due to interference between the first antenna 121 and the second antenna 131 may be prevented. In addition, grounding an antenna may provide a wider ground region which may ensure removal of parasitic resonance, thereby improving the antenna radiation performance. For example, when the first antenna 121 is connected to the ground, the second antenna 131 may operate as an antenna radiator without interference due to the first antenna 121. Further, when the first antenna 121 is connected to the ground, a ground layer including the first antenna 121 may be formed, and thus parasitic resonance may be reduced, whereby the radiation performance of the second antenna 131 may be improved.

According to an embodiment, the performance difference caused by a change in the state of the electronic device 100 may be corrected by shifting at least one of resonance frequencies at which the first antenna 121 and the second antenna 131 resonate. For example, if a resonance frequency at which the first antenna 121 and the second antenna 131 resonate when the electronic device 100 is unfolded is different from a resonance frequency at which the first antenna 121 and the second antenna 131 resonate when the electronic device 100 is folded, the performance difference caused by a change in the state of the electronic device 100 may be corrected by shifting at least one resonance frequency to match the resonance frequencies with each other.

According to an embodiment, when it is not detected, in operation 303, that the electronic device 100 is worn on the user's body, the electronic device 100 may be considered to be folded. In an example, when the first support frame 120 and the second support frame 130 rotate about the first connector 113 and the second connector 114 by a predetermined angle or larger with respect to the main frame 110, and thus the first support frame 120 and the second support frame 130 are positioned adjacent to each other, the electronic device 100 may be considered to be folded. In another example, the first support frame 120 rotates about the first connector 113 within a range of a first angle or larger, and thus the first support frame 120 is positioned adjacent to the main frame 110, and the second support frame 130 rotates about the second connector 114 within a range of an angle smaller than the first angle and thus the second support frame 130 is positioned adjacent to the main frame 110, whereby the first antenna 121 and the second antenna 131 may be positioned adjacent to each other. In another example, the second support frame 130 rotates about the second connector 114 within a range of the first angle or larger, and thus the second support frame 130 is positioned adjacent to the main frame 110, and the first support frame 120 rotates about the first connector 113 within a range of an angle smaller than the first angle, and thus the first support frame 120 is positioned adjacent to the main frame 110, whereby the first antenna 121 and the second antenna 131 may be positioned adjacent to each other.

According to an embodiment, the processor 210 may determine whether the electronic device 100 is folded, by using a capacitance value acquired through the at least one sensor 220. In an example, when the first support frame 120 and the second support frame 130 rotate about the first connector 113 and the second connector 114 by a predetermined angle or larger with respect to the main frame 110, and thus the first support frame 120 and the second support frame 130 are positioned adjacent to each other, the processor 210 may detect that the electronic device 100 is folded, by using capacitance values of the first antenna 121 and the second antenna 131, which have been measured by the at least one sensor 220.

According to an embodiment, when the electronic device 100 is folded, the processor 210 may turn off an antenna included in the support frame positioned closer to the main frame 110, among the first support frame 120 and the second support frame 130, and may turn on antenna included in the support frame positioned farther from the main frame 110, among the first support frame 120 and the second support frame 130. For example, the processor 210 may turn off the second antenna 131 and may turn on the first antenna 121 when the second support frame 130 rotates about the second connector 114 within a range of a first angle or larger, and thus the second support frame 130 is positioned adjacent to the main frame 110, and the first support frame 120 rotates about the first connector 113 within a range of an angle smaller than the first angle, and thus the first antenna 121 and the second antenna 131 are positioned adjacent to each other.

According to an embodiment, likewise, when it is detected in operation 303 that the electronic device 100 is worn on the user's body, the electronic device 100 may be considered to be unfolded.

Figure 4:
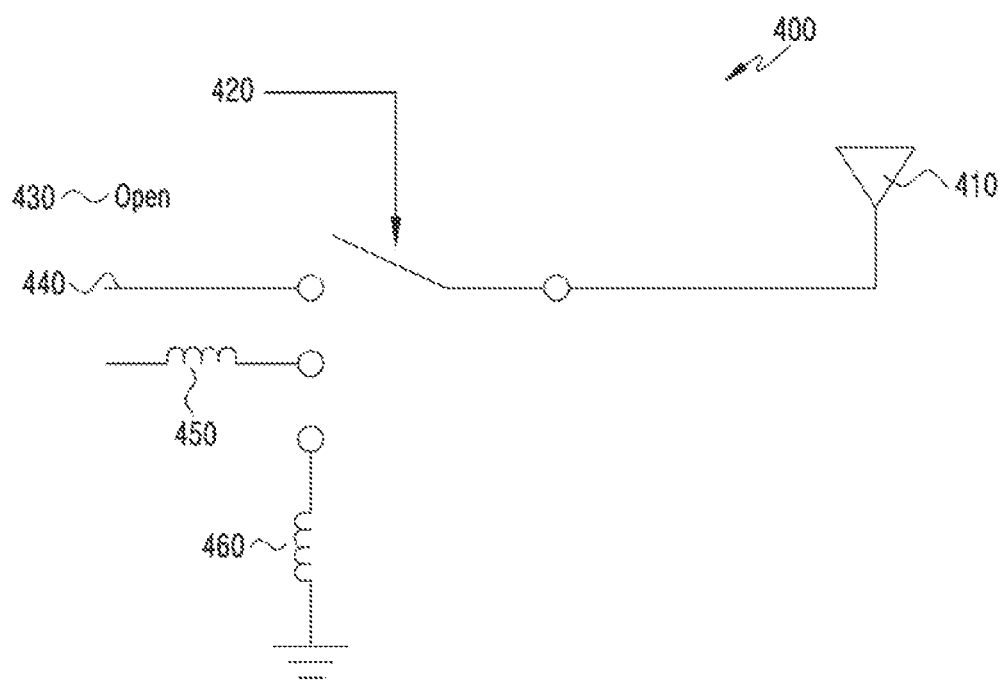
FIG. 4 is a circuit diagram illustrating a switching circuit of an electronic device according to an embodiment.

FIG. 4 is a circuit diagram illustrating a switching circuit 400 of the electronic device 100 according to an embodiment.

Referring to FIG. 4, the switching circuit 400 may include an antenna 410, a switch 420, an open terminal 430, a short circuit terminal 440, a frequency-shifting terminal 450, and a ground terminal 460. The elements of the switching circuit 400 illustrated in FIG. 4 may be replaced with other elements, or some elements may be omitted. For example, the switching circuit 400 may not include at least one among the open terminal 430, the short circuit terminal 440, the frequency-shifting terminal 450, or the ground terminal 460.

According to an embodiment, the antenna 410 may correspond to one of the first antenna 121 or the second antenna 131 illustrated in FIGS. 1A and 1B. For example, the first antenna 121 of the electronic device 100 may be connected to one of the open terminal 430, the short circuit terminal 440, the frequency-shifting terminal 450, or the ground terminal 460 through the switch 420.

According to an embodiment, when the switch 420 is connected to the open terminal 430, the antenna 410 may be in an open state. For example, when the switch 420 is connected to the open terminal 430, the first antenna 121 may be in an open state, and thus may not operate as an antenna radiator.

According to an embodiment, when the switch 420 is connected to the short circuit terminal 440, the antenna 410 may be connected to another element of the electronic device 100 via a short-circuited terminal. For example, when the switch 420 is connected to the short circuit terminal 440, the first antenna 121 may be connected to the at least one processor 210 through a short-circuited terminal, and may send a signal received from an external device to the at least one processor 210 or may transmit a signal received from the at least one processor 210 to the external device.

According to an embodiment, when the switch 420 is connected to the frequency-shifting terminal 450, the resonance frequency at which the antenna 410 resonates may be shifted. For example, when the switch 420 is connected to the frequency-shifting terminal 450 and the frequency-shifting terminal 450 includes an inductor having a designated value, the resonance frequency at which the first antenna 121 resonates may be shifted to a lower frequency band. In another example, when the switch 420 is connected to the frequency-shifting terminal 450 and the frequency-shifting terminal 450 includes a capacitor having a designated value, the resonance frequency at which the first antenna 121 resonates may be shifted to a lower frequency band.

According to an embodiment, when the switch 420 is connected to the ground terminal 460, the antenna 410 may function as the ground. For example, when the switch 420 is connected to the ground terminal 460, the ground terminal 460, including the first antenna 121, may form a ground region, and thus the ground region may be expanded when the switch 420 is connected to the ground terminal 460.

Figure 5:
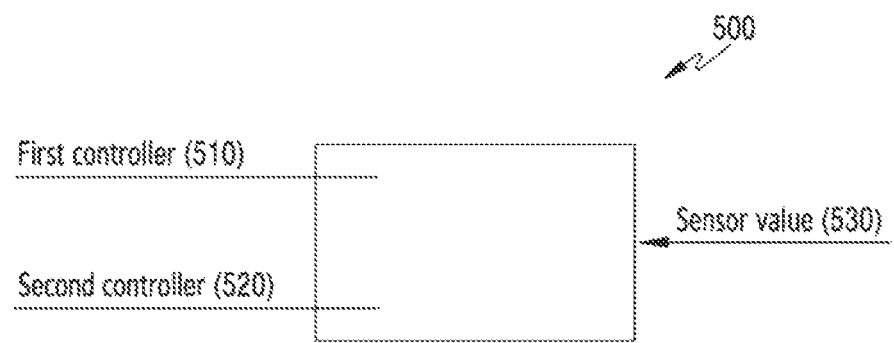
FIG. 5 illustrates a switching circuit of an electronic device controlled by a sensor value according to an embodiment.

FIG. 5 illustrates a switching circuit 500 of the electronic device 100 controlled by a sensor value 530 according to an embodiment. The switching circuit 500 illustrated in FIG. 5 may correspond to an element which is identical to the switching circuit 400 illustrated in FIG. 4, except for the differences described below.

Referring to FIG. 5, the operation of a first controller 510 or a second controller 520, which is connected to the switching circuit 500, may be determined based on the input sensor value 530. Hereinafter, in the description of FIG. 5, it is considered that the first controller 510 may determine the operation of the first antenna 121, and the second controller 520 may determine the operation of the second antenna 131.

According to an embodiment, the sensor value 530 input into the switching circuit 500 may be the value that is acquired by a proximity sensor, a contact sensor, an illuminance sensor, and/or a sensor for measuring capacitance values of the first antenna 121 and the second antenna 131. For example, the sensor value 530 may correspond to the capacitance value acquired by the proximity sensor when the electronic device 100 is worn by the user or when the electronic device 100 is positioned close to the user. In another example, the sensor value 530 may correspond to the capacitance value acquired by the contact sensor when the electronic device 100 is worn by the user and when at least a portion of the electronic device 100 is brought into contact with the user. In another example, the sensor value 530 may correspond to a value of illuminance around the electronic device 100, acquired by the illuminance sensor. In another example, the sensor value 530 may correspond to capacitance values of the first antenna 121 and the second antenna 131, which may change depending on the distance between the first antenna 121 and the second antenna 131.

According to an embodiment, when the sensor value 530 is input into the switching circuit 500, at least one of the first controller 510 or the second controller 520 may control the operation of at least one of the first antenna 121 or the second antenna 131. For example, when the sensor value 530 corresponds to the capacitance value acquired by the contact sensor and the sensor value 530 exceeds a designated value, the first controller 510 may turn on the first antenna 121 and the second controller 520 may turn on the second antenna 131. In another example, when the sensor value 530 corresponds to capacitance values of the first antenna 121 and the second antenna 131 and the sensor value 530 exceeds a designated value, the first controller 510 may turn off the first antenna 121, or may connect the same to the ground.

According to an embodiment, the first controller 510 and the second controller 520 may operate independently of each other. For example, when the sensor value 530 is input into the switching circuit 500, the first controller 510 may control the operation of the first antenna 121, but the second controller 520 may not control the operation of the second antenna 131.

Figure 6:
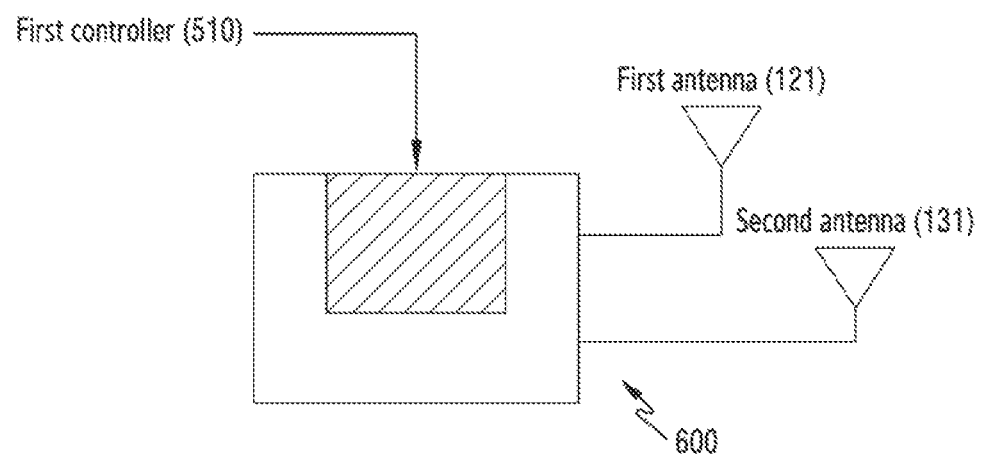
FIG. 6 illustrates a single switching circuit corresponding to multiple antennas which are included in an electronic device according to an embodiment.

FIG. 6 illustrates a single switching circuit 600 corresponding to multiple antennas 121 and 131 which are included in the electronic device 100 according to an embodiment. The switching circuit 600 illustrated in FIG. 6 may be an element which is identical to the switching circuit 400 illustrated in FIG. 4 and the switching circuit 500 illustrated in FIG. 5, except for the differences described below.

Referring to FIG. 6, the first antenna 121 and/or the second antenna 131 may be electrically and/or operatively connected to the switching circuit 600. Further, the first antenna 121 and/or the second antenna 131, which are electrically and/or operatively connected to the switching circuit 600, may be controlled by the first controller 510.

According to an embodiment, the first controller 510 may control the operation of the first antenna 121 and/or the second antenna 131. For example, when the electronic device 100 is worn by the user, the first controller 510 may perform control such that both the first antenna 121 and the second antenna 131 are turned on. In another example, when the electronic device 100 is folded, the first controller 510 may turn off at least one of the first antenna 121 or the second antenna 131 and control the other antenna, which has not been turned off, to operate as an antenna radiator without interference from the antenna which has been turned off.

Figure 7:
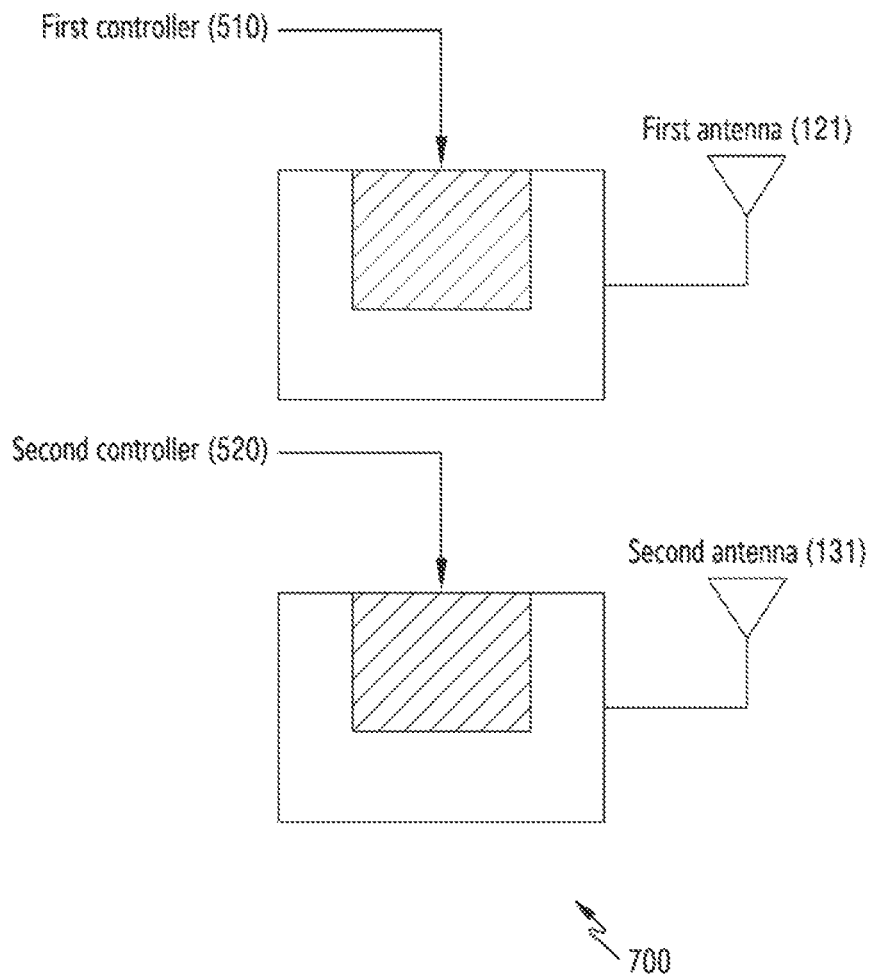
FIG. 7 illustrates multiple switching circuits corresponding to multiple antennas which are included in an electronic device according to an embodiment.

FIG. 7 illustrates multiple switching circuits 700 corresponding to multiple antennas 121 and 131 which are included in the electronic device 100 according to an embodiment. The multiple switching circuits 700 illustrated in FIG. 7 may be elements that are identical to the switching circuit 600 illustrated in FIG. 6, except for the number of controllers.

Referring to FIG. 7, the first antenna 121 and the second antenna 131 may be electrically and/or operatively connected to respective ones of the multiple switching circuits 700. Further, the first antenna 121 and/or the second antenna 131, which are electrically and/or operatively connected to the multiple switching circuits 700, respectively, may be controlled by the first controller 510 and/or the second controller 520.

According to an embodiment, the first controller 510 may control the operation of the first antenna 121 which is electrically and/or operatively connected to one of the multiple switching circuits 700. For example, when the electronic device 100 is worn on a user, the first controller 510 may control the first antenna 121 to be turned on.

According to another embodiment, the second controller 520 may control the operation of the second antenna 131 which is electrically and/or operatively connected to one of the multiple switching circuits 700. For example, when the electronic device 100 is worn on a user, the second controller 520 may control the second antenna 131 to be turned on.

According to an embodiment, unlike the switching circuit 600 illustrated in FIG. 6, in the multiple switching circuits 700 illustrated in FIG. 7, the first antenna 121 and/or the second antenna 131 may be controlled by different controllers (e.g., the first controller 510 or the second controller 520). For example, when the first controller 510 turns off the first antenna 121, the second controller 520 may not control the operation of the second antenna 131.

Figure 8:
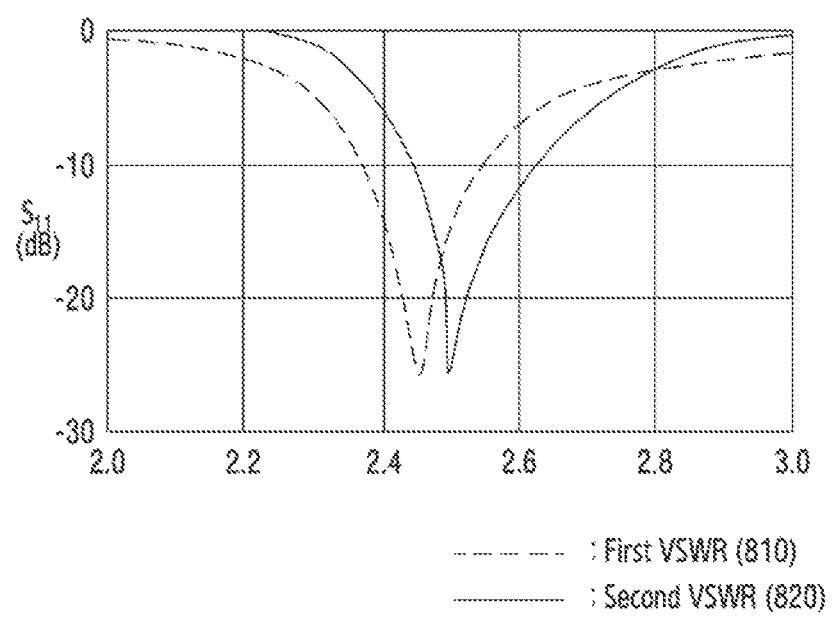
FIG. 8 is a graph showing a voltage standing wave ratio (VSWR) according to radiation of multiple antennas of an electronic device according to an embodiment.

FIG. 8 is an S11 graph showing voltage standing wave ratio (VSWR) of multiple antennas 121 and 131 of the electronic device 100 according to an embodiment. The voltage standing wave ratio (VSWR) refers to the ratio between the maximum amplitude and the minimum amplitude of a voltage standing wave, which is the sum of two signals having the same amplitude and opposite traveling directions.

Referring to FIG. 8, signals received by the first antenna 121 and the second antenna 131 may have different VSWR graphs (e.g., a first VSWR graph 810 and a second VSWR graph 820).

According to an embodiment, when the electronic device 100 is unfolded and when the electronic device 100 is folded, the VSWR graphs of signals received by the first antenna 121 and the second antenna 131 may vary. For example, when the electronic device 100 is folded, the VSWR graph of the first antenna 121 and the second antenna 131 may be identical to the first VSWR graph 810. In another example, when the electronic device 100 is unfolded (i.e., when the first support frame 120 and the second support frame 130 are positioned so as to be spaced apart from each other), the VSWR graph of the first antenna 121 and the second antenna 131 may be identical to the second VSWR graph 820.

According to an embodiment, points having resonance frequencies at the first VSWR graph 810 and the second VSWR graph 820 (i.e., points at which S11 has minimum values at the first VSWR graph 810 and the second VSWR graph 820) may be different from each other. In an example, points having resonance frequencies at the first VSWR graph 810 and the second VSWR graph 820 may be different from each other when the electronic device 100 is folded and when the electronic device 100 is unfolded.

According to an embodiment, when points having resonance frequencies at the first VSWR graph 810 and the second VSWR graph 820 are different from each other, a switching circuit (e.g., the switching circuit 400 illustrated in FIG. 4) may be used to match resonance frequencies of the first VSWR graph 810 and the second VSWR graph 820. For example, when the resonance frequency of the first VSWR graph 810 is lower than the resonance frequency of the second VSWR graph 820, in the switching circuit 400 of the electronic device 100, if the switch 420 is connected to the frequency-shifting terminal 450, the frequency at which the antenna 410 (e.g., the first antenna 121 or the second antenna 131 in FIGS. 1A and 1B) resonates is shifted to a lower frequency band, and thus may match the resonance frequency of the first VSWR graph 810.

Figure 9:
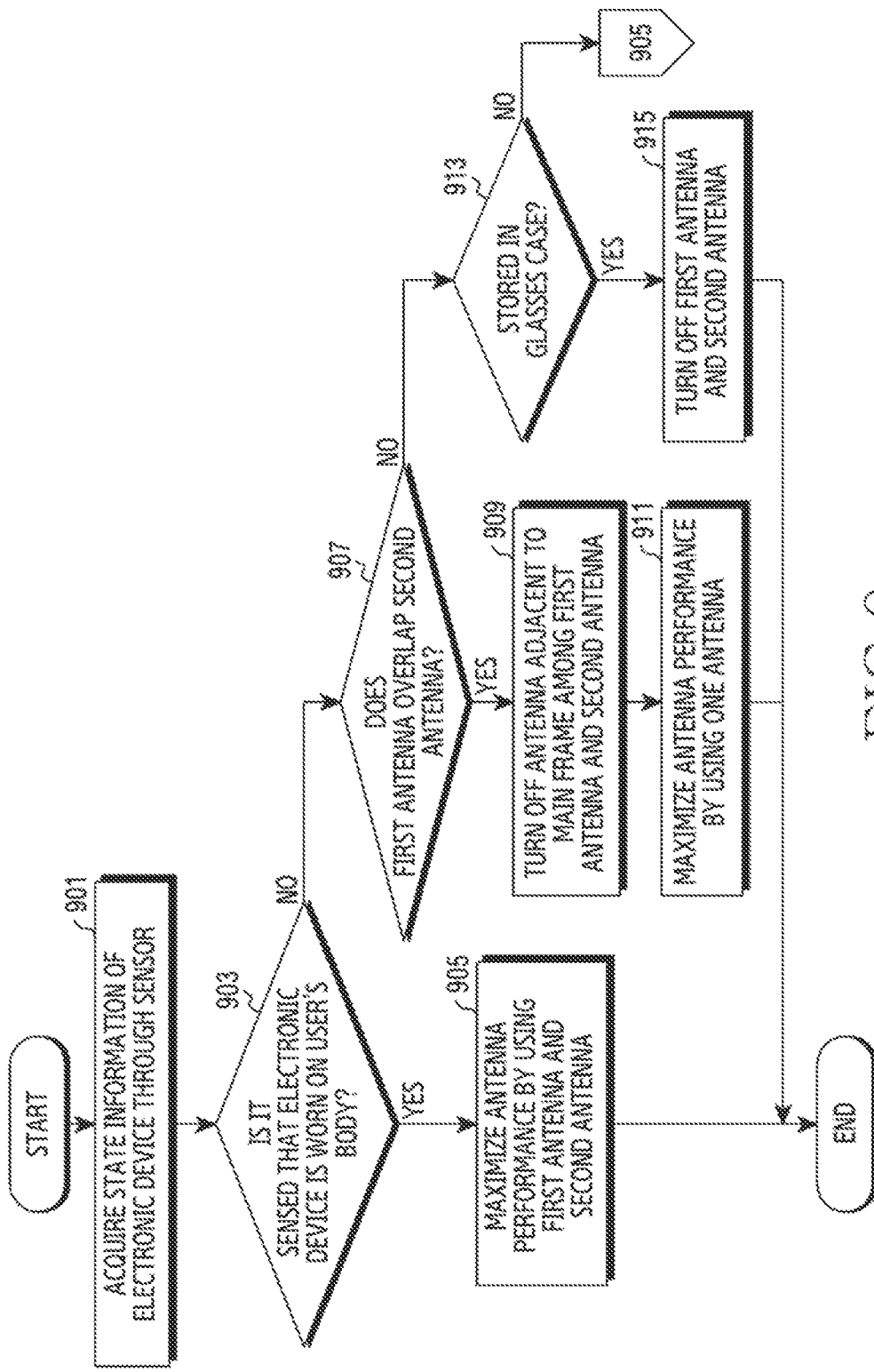
FIG. 9 is an operation flowchart based on the state of use of an electronic device according to an embodiment.

FIG. 9 is an operation flowchart based on the state of use of the electronic device 100 according to an embodiment.

Referring to FIG. 9, the electronic device 100 may acquire state information of the electronic device 100 through the at least one sensor 220. When it is detected that the electronic device 100 is worn on the user's body, the electronic device 100 may turn on both the first antenna 121 and the second antenna 131. When it is detected that the electronic device 100 is not worn on the user's body, the electronic device 100 may turn off at least one of the first antenna 121 or the second antenna 131, may connect the at least one antenna to the ground, or may shift the resonance frequency of the at least one antenna, based on whether the electronic device 100 is stored in a glasses case or on whether the first antenna 121 and the second antenna 131 overlap each other.

In operation 901, the electronic device 100 according to an embodiment may acquire state information of the electronic device 100 through the at least one sensor 220. In an example, the operation of the electronic device 100 according to operation 901 may be identical to operation 301 illustrated in FIG. 3.

In operation 903, the electronic device 100 according to an embodiment may detect that the electronic device 100 is worn on the user's body. In an example, the operation of the electronic device 100 according to operation 903 may be identical to operation 303 illustrated in FIG. 3.

When it is detected that the electronic device 100 is worn on the user's body, the electronic device 100 according to an embodiment may maximize, in operation 905, antennal performance by using both the first antenna 121 and the second antenna 131. For example, when it is detected, through the capacitance value of a proximity sensor or a contact sensor, that the electronic device 100 is worn on the user's body, the electronic device 100 may turn on both the first antenna 121 and the second antenna 131 to maximize antenna performance using both the first antenna 121 and the second antenna 131. In another example, when it is detected, through capacitance values of the first antenna 121 and the second antenna 131, that the electronic device 100 is unfolded, the electronic device 100 may turn on both the first antenna 121 and the second antenna 131, and thus the first antenna 121 and the second antenna 131 may operate in a multi-input multi-output (MIMO) manner, thereby maximizing antenna performance.

When it is not detected that the electronic device 100 is worn on the user's body, the electronic device 100 according to an embodiment may determine, in operation 907, whether the first antenna 121 and the second antenna 131 overlap each other. For example, when it is determined that a hall IC sensor is not in contact with at least a portion of a glasses case and thus the electronic device 100 is not stored in the glasses case, the electronic device 100 may determine whether the first antenna 121 and the second antenna 131 overlap each other.

According to an embodiment, the electronic device 100 may determine, using a sensor for sensing capacitance values of the first antenna 121 and the second antenna 131, whether the first antenna 121 and the second antenna 131 overlap each other. For example, when the capacitance value, acquired by the sensor for sensing capacitance values of the first antenna 121 and the second antenna 131, is equal to or greater than a designated value, the electronic device 100 may determine that the first antenna 121 and the second antenna 131 overlap each other.

According to an embodiment, the overlapping of the first antenna 121 and the second antenna 131 may indicate the state in which the electronic device 100 is folded. In an example, the folded state of the electronic device 100 may correspond to the case in which one of the first support frame 120 and the second support frame 130 is positioned adjacent to the main frame 110. For example, the first support frame 120 rotates about the first connector 113 within a range of a first angle or larger, and thus the first support frame 120 is positioned adjacent to the main frame 110, and the second support frame 130 rotates about the second connector 114 within a range of an angle smaller than the first angle, and thus the second support frame 130 is positioned adjacent to the main frame 110, whereby the first antenna 121 and the second antenna 131 may be positioned adjacent to each other. In another example, the second support frame 130 rotates about the second connector 114 within the range of the first angle or larger, and thus the second support frame 130 is positioned adjacent to the main frame 110, and the first support frame 120 rotates about the first connector 113 within the range of an angle smaller than the first angle, and thus the first support frame 120 is positioned adjacent to the main frame 110, whereby the first antenna 121 and the second antenna 131 may be positioned adjacent to each other.

According to an embodiment, whether the first support frame 120 or the second support frame 130 is positioned closer to the main frame 110 may not affect the determination of whether the electronic device 100 is folded. For example, the first support frame 120 may be positioned more adjacent to the main frame 110 than the second support frame 130, in which case the first antenna 121 is positioned more adjacent closer to the main frame 110 than the second antenna 131. Or the second support frame 130 may be positioned more adjacent to the main frame 110 than the first support frame 120, in which case the second antenna 131 is positioned more adjacent to the main frame 110 than the first antenna 121.

According to an embodiment, when it is determined that the first antenna 121 and the second antenna 131 overlap each other, the electronic device 100 may turn off the antenna adjacent to the main frame 110, among the first antenna 121 or the second antenna 131, in operation 909. For example, when it is determined that the capacitance value, acquired by the sensor for sensing capacitance values of the first antenna 121 and the second antenna 131, is greater than the designated value and thus the first antenna 121 and the second antenna 131 overlap each other, the electronic device 100 may turn off the first antenna 121 included in the first support frame 120, which is positioned closer to the main frame 110, because the first support frame 120 rotates by a larger angle than the second support frame 130 with respect to the main frame 110.

In an embodiment, when it is determined that the first antenna 121 and the second antenna 131 overlap each other, the electronic device 100 may turn off the antenna positioned more adjacent to the main frame 110, among the first antenna 121 or the second antenna 131, so as to improve antenna performance compared with the case of turning off the antenna positioned farther from the main frame 110.

When it is determined that the first antenna 121 and the second antenna 131 overlap each other, if the antenna more adjacent to the main frame 110, among the first antenna 121 or the second antenna 131, is turned off, the electronic device 100 according to an embodiment may maximize, in operation 911, antenna performance by using the antenna positioned farther from the main frame 110.

When it is determined that the first antenna 121 and the second antenna 131 do not overlap each other, the electronic device 100 according to an embodiment may determine, in operation 913, whether the electronic device 100 is stored in the glasses case. For example, when it is detected, through the capacitance value of a proximity sensor or a contact sensor, that the electronic device 100 is not worn on the user's body, the electronic device 100 may determine whether the electronic device 100 is stored in the glasses case.

According to an embodiment, the electronic device 100 may use an illuminance sensor to determine whether the electronic device 100 is stored in a case (e.g., the glasses case). In an example, the electronic device 100 may determine whether the electronic device 100 is stored in the glasses case, based on a value of illuminance around the electronic device 100, detected by the illuminance sensor. For example, when the value of illuminance around the electronic device 100 detected by the illuminance sensor is smaller than a designated value, the electronic device 100 may determine that the electronic device 100 is stored in the glasses case.

According to another embodiment, the electronic device 100 may use a hall IC sensor to determine whether the electronic device 100 is stored in the glasses case. For example, when the hall IC sensor of the electronic device 100 is in contact with at least a portion of the glasses case, the electronic device 100 is determined to be stored in the glasses case.

According to an embodiment, when the electronic device 100 is stored in the glasses case, the electronic device 100 may be charged by a power feeder of the glasses case. For example, the electronic device 100 may be supplied with power through a feeding path or a wireless charging module of the glasses case, and when power is being supplied to the electronic device 100, it may be determined that the electronic device 100 is stored in the glasses case.

When it is determined that the electronic device 100 is stored in the glasses case, the electronic device 100 according to an embodiment may turn off both the first antenna 121 and the second antenna 131 in operation 915. For example, when the value of illuminance around the electronic device 100, detected by the illuminance sensor of the electronic device 100, is smaller than the designated value and thus the electronic device 100 is determined to be stored in the glasses case, the electronic device 100 may turn off both the first antenna 121 and the second antenna 131 such that antenna radiation is not performed.

According to an embodiment, the glasses case may also include an antenna which is different from the first antenna 121 and the second antenna 131. In an example, when it is determined that the electronic device 100 is stored in the glasses case, the electronic device 100 may transmit and/or receive radio signals by using the antenna included in the glasses case.

When it is determined that the electronic device 100 is not stored in the glasses case, the electronic device 100 according to an embodiment may carry out operation 905 to maximize antenna performance based on the first antenna 121 and the second antenna 131.

According to another embodiment which is not illustrated in FIG. 9, when it is not detected, in operation 903, that the electronic device 100 is worn on the user's body, without performing operation 907, the electronic device 100 may determine, in operation 911, whether the first antenna 121 and the second antenna 131 overlap each other. The description of operations 911 to 915 may be equally applied to operations sequent thereto.

Figure 10:
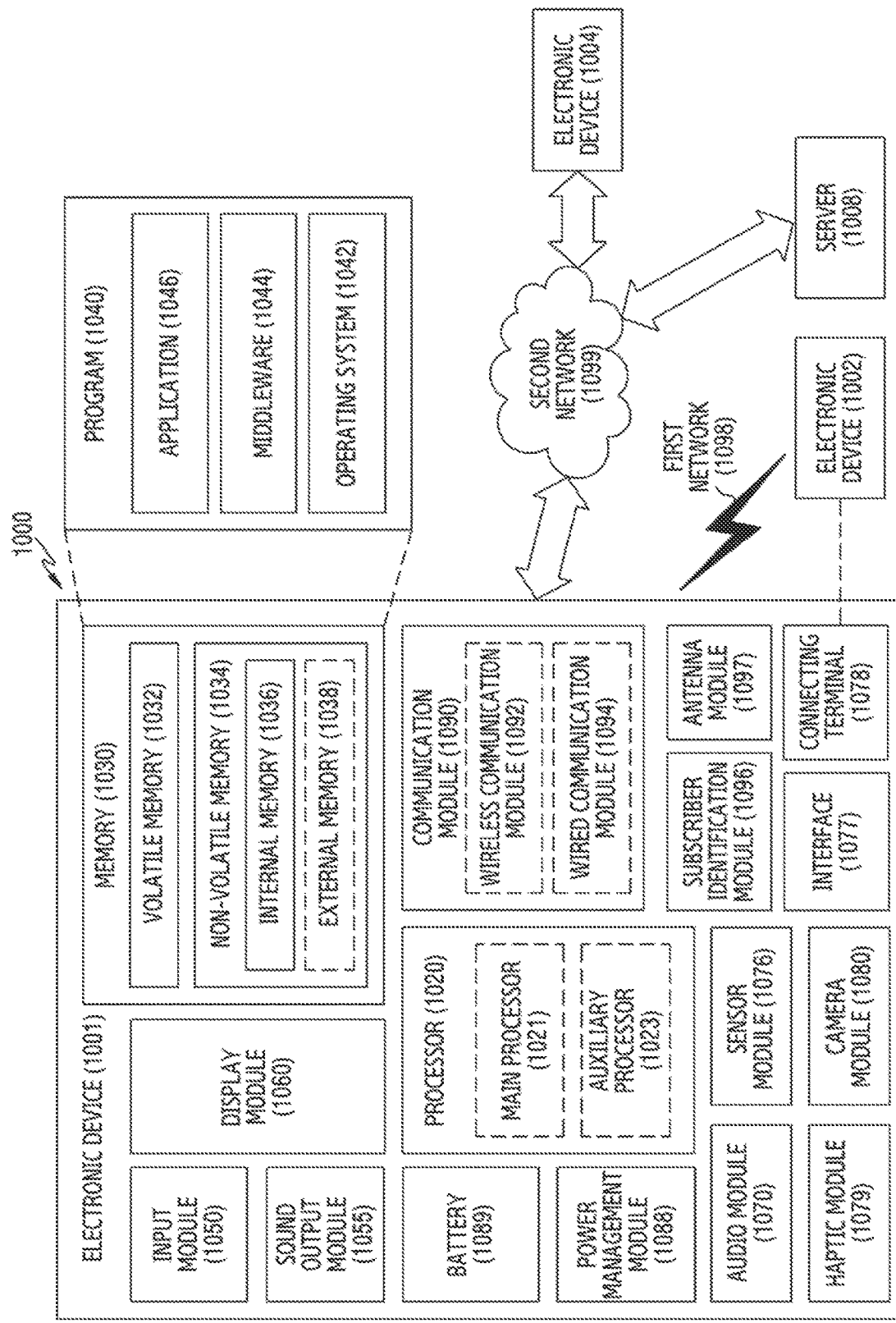
FIG. 10 is a block diagram of an electronic device in a network environment according to an embodiment.

FIG. 10 is a block diagram illustrating an electronic device 1001 in a network environment 1000 according to an embodiment. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

An electronic device 100 according to an embodiment may include at least one display 111 or 112 configured to provide a left-eye image and/or a right-eye image, a main frame 110 to which the at least one display 111 or 112 is mounted, a first support frame 120 which is connected to the main frame through a first connector 113 and includes a first antenna 121, a second support frame 130 which is connected to the main frame 110 through a second connector 114 positioned opposite of the first connector 113 and includes a second antenna 131, at least one processor 210 electrically connected to the first antenna 121 and the second antenna 131, and at least one sensor 220 electrically connected to the at least one processor 210, wherein the at least one processor 210 performs, when the at least one sensor 220 detects that the electronic device 100 is unfolded, wireless communication using the first antenna 121 and the second antenna 131, and when the at least one sensor 220 detects that the electronic device 100 is folded, turns off the first antenna 121 and/or the second antenna 131, connects the first antenna 121 and/or the second antenna 131 to a ground, or shifts the resonance frequency of the first antenna 121 and/or the second antenna 131.

The electronic device according to an embodiment may be a glass-type wearable device capable of being mounted on a user's head.

The electronic device according to an embodiment may further include at least one proximity sensor, wherein the at least one proximity sensor detects, using a capacitance value, whether the electronic device is worn on a user's body.

According to an embodiment, when the electronic device is folded, one of the first support frame and the second support frame is positioned adjacent to the main frame.

According to an embodiment, when the electronic device is folded, the at least one processor may turn on an antenna positioned farther from the main frame, among the first antenna and the second antenna, and may turn off an antenna positioned closer to the main frame or may connect, to a ground, the antenna positioned closer to the main frame.

The electronic device according to an embodiment may further include an illuminance sensor, wherein, when the electronic device is folded, the at least one processor determines, based on an illuminance detected by the illuminance sensor, whether the electronic device is being charged, and turns off the first antenna and the second antenna when it is determined that the electronic device is being charged.

According to an embodiment, the main frame, the first support frame, and the second support frame may be electrically connected to each other through a flexible printed circuit board (FPCB).

According to an embodiment, the first connector and the second connector may include hinge structures.

According to an embodiment, the at least one processor may supply power to the first antenna and the second antenna through the hinge structures, and may transmit data obtained via wireless communication to the at least one display.

According to an embodiment, the resonance frequency may correspond to one of 2.4 GHz, 5 GHz, or 6 GHz.

An operation method of an electronic device according to various embodiments may include performing wireless communication using a first antenna and a second antenna included in the electronic device when at least one sensor included in the electronic device detects that the electronic device is unfolded, and when the at least one sensor detects that the electronic device is folded, turning off the first antenna and/or the second antenna, connecting the first antenna and/or the second antenna to a ground, or shifting a resonance frequency of the first antenna and/or the second antenna.

The operation method of the electronic device according to an embodiment may further include sensing, using a capacitance value of at least one proximity sensor included in the electronic device, whether the electronic device is worn on a user's body.

According to an embodiment, when the electronic device is folded, one of the first antenna and the second antenna is positioned adjacent to a main frame of the electronic device.

The operation method of the electronic device according to an embodiment may further include, when the electronic device is folded, turning on an antenna positioned farther from the main frame, among the first antenna and the second antenna, and turning off an antenna positioned closer to the main frame or connecting, to a ground, the antenna positioned closer to the main frame.

The operation method of the electronic device according to an embodiment is an operation method of the electronic device which further includes, when the electronic device is folded, determining, based on an illuminance detected by an illuminance sensor included in the electronic device, whether the electronic device is being charged, and turning off the first antenna and the second antenna when it is determined that the electronic device is being charged.

A wearable device according to an embodiment may include a first display for a left-eye image, a second display for a right-eye image, a main frame to which the first display and the second display are mounted, a first support frame which is connected to the main frame through a first connector adjacent to the first display and includes a first antenna, a second support frame which is connected to the main frame through a second connector positioned adjacent to the second display and opposite of the first connector, and includes a second antenna, at least one processor electrically connected to the first antenna and the second antenna, and at least one sensor electrically connected to the at least one processor, wherein the at least one processor displays virtual reality through the first display and/or the second display, performs wireless communication using the first antenna and the second antenna when the at least one sensor detects that the wearable device is unfolded, and when the at least one sensor detects that the wearable device is folded, turns off the first antenna and/or the second antenna, connects the first antenna and/or the second antenna to a ground, or shifts a resonance frequency of the first antenna and/or the second antenna.

The wearable device according to an embodiment may further include at least one proximity sensor, wherein the at least one proximity sensor detects, using a capacitance value, whether the wearable device is worn on a user's body.

According to an embodiment, when the wearable device is folded, one of the first support frame and the second support frame is positioned adjacent to the main frame.

According to an embodiment, when the wearable device is folded, the at least one processor may turn on an antenna positioned farther from the main frame, among the first antenna and the second antenna, and may turn off an antenna positioned closer to the main frame, or may connect, to a ground, the antenna positioned closer to the main frame.

The wearable device according to an embodiment may further include an illuminance sensor, wherein, when the wearable device is folded, the at least one processor determines, based on an illuminance detected by the illuminance sensor, whether the wearable device is being charged, and turns off the first antenna and the second antenna when it is determined that the wearable device is being charged.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   at least one display configured to provide a left-eye image and/or a right-eye image;
   a main frame to which the at least one display is mounted;
   a first support frame which is connected to the main frame through a first connector and comprises a first antenna;
   a second support frame which is connected to the main frame through a second connector positioned opposite of the first connector and comprises a second antenna;

at least one processor electrically connected to the first antenna and the second antenna; and at least one sensor electrically connected to the at least one processor, wherein the at least one processor is configured to:

perform, when the at least one sensor detects that the electronic device is unfolded, wireless communication using the first antenna and the second antenna; and when the at least one sensor detects that the electronic device is folded, turn off the first antenna and/or the second antenna, connect the first antenna and/or the second antenna to a ground, or shift a resonance frequency of the first antenna and/or the second antenna.

2. The electronic device of claim 1, wherein the electronic device is a glass-type wearable device capable of being mounted on a user's head.

3. The electronic device of claim 1, further comprising at least one proximity sensor, wherein the at least one proximity sensor is configured to detect, using a capacitance value, whether the electronic device is worn on a body of a user.

4. The electronic device of claim 1, wherein when the electronic device is folded, one of the first support frame and the second support frame is positioned adjacent to the main frame.

5. The electronic device of claim 4, wherein when the electronic device is folded, the at least one processor is configured to:

turn on an antenna positioned farther from the main frame, among the first antenna and the second antenna, and turn off an antenna positioned closer to the main frame or connect, to the ground, the antenna positioned closer to the main frame.

6. The electronic device of claim 4, further comprising an illuminance sensor, wherein the at least one processor is configured to:

determine, when the electronic device is folded, whether the electronic device is being charged based on an illuminance detected by the illuminance sensor; and turn off the first antenna and the second antenna when it is determined that the electronic device is being charged.

7. The electronic device of claim 1, wherein the main frame, the first support frame, and the second support frame are configured to be electrically connected to each other through a flexible printed circuit board (FPCB).

8. The electronic device of claim 1, wherein the first connector and the second connector comprise hinge structures.

9. The electronic device of claim 8, wherein the at least one processor is configured to:

supply power to the first antenna and the second antenna through the hinge structures; and transmit data obtained via wireless communication to the at least one display.

10. The electronic device of claim 1, wherein the resonance frequency corresponds to one of 2.4 GHz, 5 GHz, or 6 GHz.

11. An operation method of an electronic device, comprising:

performing wireless communication using a first antenna and a second antenna included in the electronic device when at least one sensor included in the electronic device detects that the electronic device is unfolded; and when the at least one sensor detects that the electronic device is folded, turning off the first antenna and/or the second antenna, connecting the first antenna and/or the second antenna to a ground, or shifting a resonance frequency of the first antenna and/or the second antenna.

12. The operation method of claim 11, further comprising detecting whether the electronic device is worn on a body of a user, using a capacitance value of at least one proximity sensor included in the electronic device.

13. The operation method of claim 11, wherein when the electronic device is folded, one of the first antenna and the second antenna is positioned adjacent to a main frame of the electronic device.

14. The operation method of claim 13, further comprising, when the electronic device is folded:

turning on an antenna positioned farther from the main frame, among the first antenna and the second antenna, and turning off an antenna positioned closer to the main frame or connecting, to the ground, the antenna positioned closer to the main frame.

15. The operation method of claim 13, further comprising:

when the electronic device is folded, determining whether the electronic device is being charged based on an illuminance detected by an illuminance sensor included in the electronic device; and turning off the first antenna and the second antenna when it is determined that the electronic device is being charged.

* * * * *